United States Patent [19]

Yamamoto

[11] Patent Number: 5,185,656
[45] Date of Patent: Feb. 9, 1993

[54] CIRCUIT FOR COMPRESSING IMAGE SIGNAL

[75] Inventor: Kazumi Yamamoto, Tokyo, Japan

[73] Assignee: Ikegami Tsushinki Co., Ltd., Tokyo, Japan

[21] Appl. No.: 773,312

[22] Filed: Oct. 11, 1991

[51] Int. Cl.$^5$ .............................................. H04N 9/64
[52] U.S. Cl. ................................. 358/21 R; 358/160; 358/171; 358/34
[58] Field of Search ............... 358/21 R, 37, 166, 160, 358/35, 34, 38, 906, 909, 41, 171, 172, 170, 133, 135, 136, 169; 382/56, 53

[56] References Cited

U.S. PATENT DOCUMENTS

4,441,121 4/1984 Harwood .............................. 358/37
4,646,152 2/1987 Eichelberger ....................... 358/38

Primary Examiner—James J. Groody
Assistant Examiner—Sherrie Hsia
Attorney, Agent, or Firm—Spencer, Frank & Schneider

[57] ABSTRACT

An image signal compressing circuit for compressing an input image signal non-linearly including an attenuating circuit for attenuating the input image signal to derive an attenuated image signal, a capacitance for removing a direct current component of the attenuated image signal, a direct level setting circuit for adding a variable direct current potential to the attenuated image signal having the direct component removed therefrom to produce a composite image signal, a non-additive mixing circuit for selecting a smaller image signal between the input image signal and the composite image signal as a compressed image signal, a peak detecting circuit for detecting a maximum value of the compressed image signal, and a variable direct current forming circuit for generating the variable direct current potential to be applied to the direct current level setting circuit such that the maximum value of the compressed image signal does not exceed a predetermined level, while a knee point is shifted in accordance with an excessive amplitude of the input image signal, so that a contrast of a compressed image portion is not decreased.

11 Claims, 11 Drawing Sheets

FIG. 12

CIRCUIT FOR COMPRESSING IMAGE SIGNAL

BACKGROUND OF THE INVENTION

1. Field of the Invention and Description of the Related Art

The present invention relates to a circuit for compressing an image signal, and more particularly relates to a circuit for compressing an image signal picked-up by a color television camera such that a maximum value of the image signal does not exceed a predetermined level.

An image pick-up device of the television camera has a very wide dynamic range and sometimes its dynamic range amounts to 400 to 500% of that of an image signal processing system by means of which the image signal generated by the pick-up device is processed. In order to process the image signal having a wide dynamic range, there is provided a so-called auto-knee circuit which compresses the image signal non linearly in the television camera.

Figure 1:
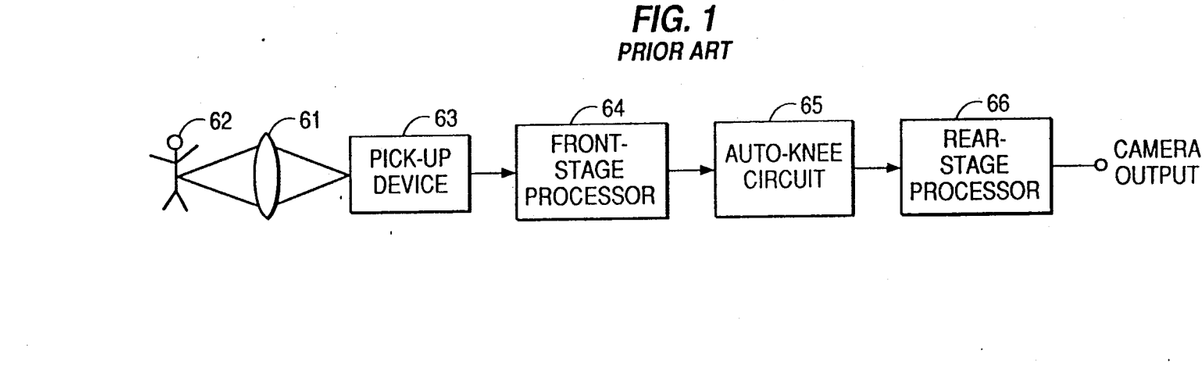
FIG. 1 is a schematic view showing a television camera including the known image signal compressing circuit.

FIG. 1 is a schematic view showing a television camera including a known auto-knee circuit. An imaging lens 61 forms an image of an object 62 on an image pickup device 63. An image signal generated by the pick-up device 63 is processed by a front-stage image processing circuit 64. An image signal processed by the front-stage image processing circuit 64 is then supplied to an autoknee circuit 65 and is compressed thereby. A compressed image signal generated by the auto-knee circuit 65 is furthe processed by a rear-stage image signal processing circuit 66.

There have been proposed auto-knee circuits having various constructions.

For instance, in Japanese Utility Model Publication Kokai Sho No. 60-22076, there is disclosed a known auto-knee circuit, in which a diode is connected in series with a field effect transistor whose conduction is controlled by a peak level of an input image signal and a reverse bias is applied to the diode to set a compression start level. Futher, in Japanese Utility Model Publication No. 63-22765, there is described another known auto-knee circuit for compressing red, green and blue color signals, in which a maximum value of the color signals is detected and gains of amplifiers for amplifying the respective color signals are controlled by the detected maximum value. Then, the input color signals are compared with respective amplified color signals and smaller color signals are selected as compressed color signals. In this manner, portions of the input color signals which exceed a predetermined level can be compressed smoothly.

Moreover, in the television camera illustrated in FIG. 1 the front-stage image signal processing circuit 64 is provided before the auto-knee circuit 65, so that this front-stage image signal processing circuit has to be constructed to be able to process the image signal having the very wide dynamic range. Therefore, the supply source voltage must be made high and a power consumption is liable to be large.

In the known auto-knee circuit disclosed in Japanese Utility Model Publication Kokai Sho No. 60-22076, the compression factor is constant, so that the decrease in the contrast is not recognized. However, a knee point is fixed by a variable resistor, and thus the peak value of the output compressed image signal is undersirably changed.

In the known auto-knee circuit described in Japanese Utility Model Publication No. 63-22765, the peak value of the input image signal is detected and the gain of the amplifier is controlled in accordance with the detected peak value. When the level of the input image signal is excessively large, the compression factor becomes too large so that the contrast of the compressed portion is decreased. This operation is similar to that of a clipping circuit having a constant clipping level. Futher the circuit construction becomes complicated and expensive due to the provision of AGC.

SUMMARY OF THE INVENTION

The present invention has for its object to provide a novel and usedful circuit for compressing an image signal, in which the compression factor can be kept constant, so that the decrease in the contrast can be avoided even under the excessively large input level and a knee point can be moved such that the peak value of the image signal can be maintained to a constant level.

According to the invention, a circuit for compressing an image signal comprises:

attenuating means for attenuating an input image signal by an attennuation factor to derive an attenuated image signal;

direct current level setting means for adding a variable direct current potential to the attenuated image signal to derive a composite image signal of the attenuated image signal and the variable direct current potential;

non-additive mixing means for comparing the input image signal and the composite image signal with each other and selecting a smaller image signal as a compressed image signal;

maximum value detecting means for detecting a maximum value of the compressed image signal generated by said non-additive mixing means; and variable direct current potential forming means for receiving the maximum value of the compressed image signal to generate the variable direct current potential which is supplied to said direct current potential setting means such that the maximum value of the compressed image signal derived from said non-additive mixing means does not exceed a predetermined level.

In the image signal compressing circuit according to the invention, the knee point is not fixed, but is varied in accordance with the maximum value of the output compressed image signal, so that the compression factor is fixed and thus the contrast is not deteriorated. Futher the peak value of the compressed image signal does not exceed a predetermined level. Moreover, the knee point can be determined at will by suitably selecting the maximum value of the output compressed image signal or the attenuation factor in the attenuating means, and therefore the most suitable compression can be performed in dependence upon various objects and circumstances under which the objects are to be picked-up.

When the image signal compressing circuit according to the invention is applied to the color television camera, it is preferable to provide the image signal compressing circuit immediately after the pick-up device. Then, the dynamic range of the circuits following the image signal compressing circuit can be decreased and thus the supply source voltage can be made lower and the power consumption can be saved.

DESCRIPTION OF THE PREFERRED EMBODIMENTS

Figure 2:
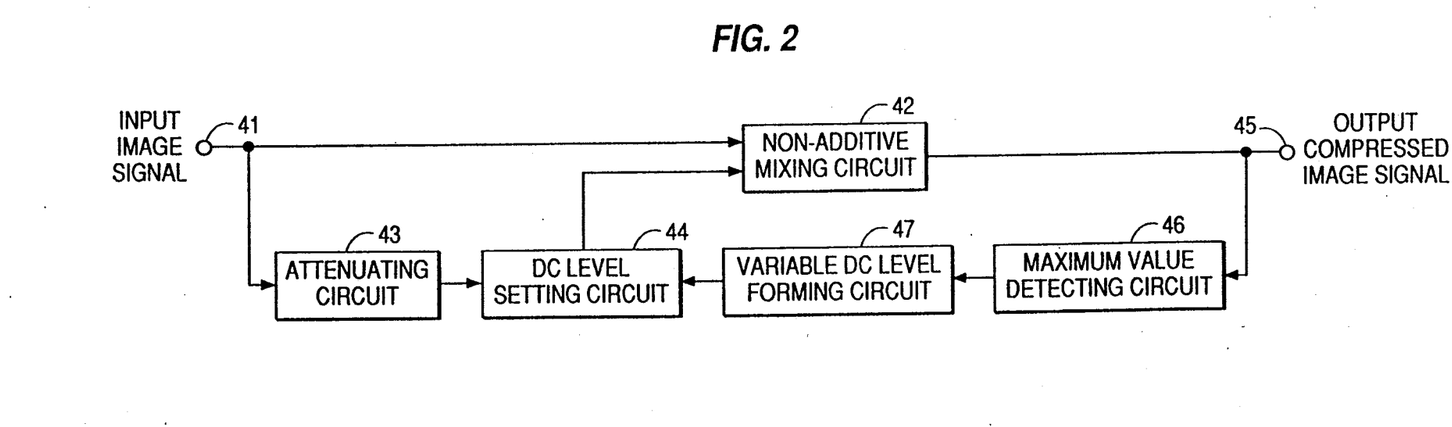
FIG. 2 is a block diagram illustrating an embodiment of the image signal compressing circuit according to the invention.

FIG. 2 is a block diagram showing the principal construction of the image signal compressing circuit according to the invention. An input image signal received at an input terminal 41 is supplied to a nonadditive mixing circuit 42 as well as to an attenuating circuit 43 which serves to reduce the level of the input image signal by a predeterminated attenuation factor. An attenuated image signal generated by the attenuating circuit 43 is supplied to a direct current level setting circuit 44. The direct current level setting circuit 44 functions to add a variable direct current potential to the attenuated image signal. As will be apparent, the variable direct current potential is inversely changed in accordance with a maximum value of the attenuated image signal. In this manner, the direct current level setting circuit 44 produces a composite image signal of the attenuated image signal and the variable direct current potential. Then the composite image signal is applied to the non-additive mixing circuit 42. In the non-additive mixing circuit 42, the input image signal and the composite image signal are compared with each other and a smaller image signal is selected and is supplied to an output terminal 45 as a compressed image signal. The output compressed image signal appearing at the output terminal 45 is supplied to a maximum value detecting circuit 46 and a maximum value of the compressed image signal is detected. Then, the thus detected maximum value is supplied to a direct current potential forming circuit 47 and a direct current potential formed by this circuit 47 is further supplied to the direct current potential setting circuit 44.

In the image signal compressing circuit according to the invention, when the input image signal is small, the variable direct current potential to be added to the attenuated image signal becomes large, so that the non-additive mixing circuit 42 selects the input image signal supplied to the input terminal 41 and the signal compression is not performed. But, when the input image signal becomes large, the variable direct current voltage is decreased and the non-additive mixing circuit 42 selects the composite image signal having the small direct current potential added thereto. In this manner, the direct current potential is changed in accordance with the level of the input image signal, and therefore the knee point at which the signal compression is carried out is also changed in accordance with the level of the input image signal.

Figure 3:
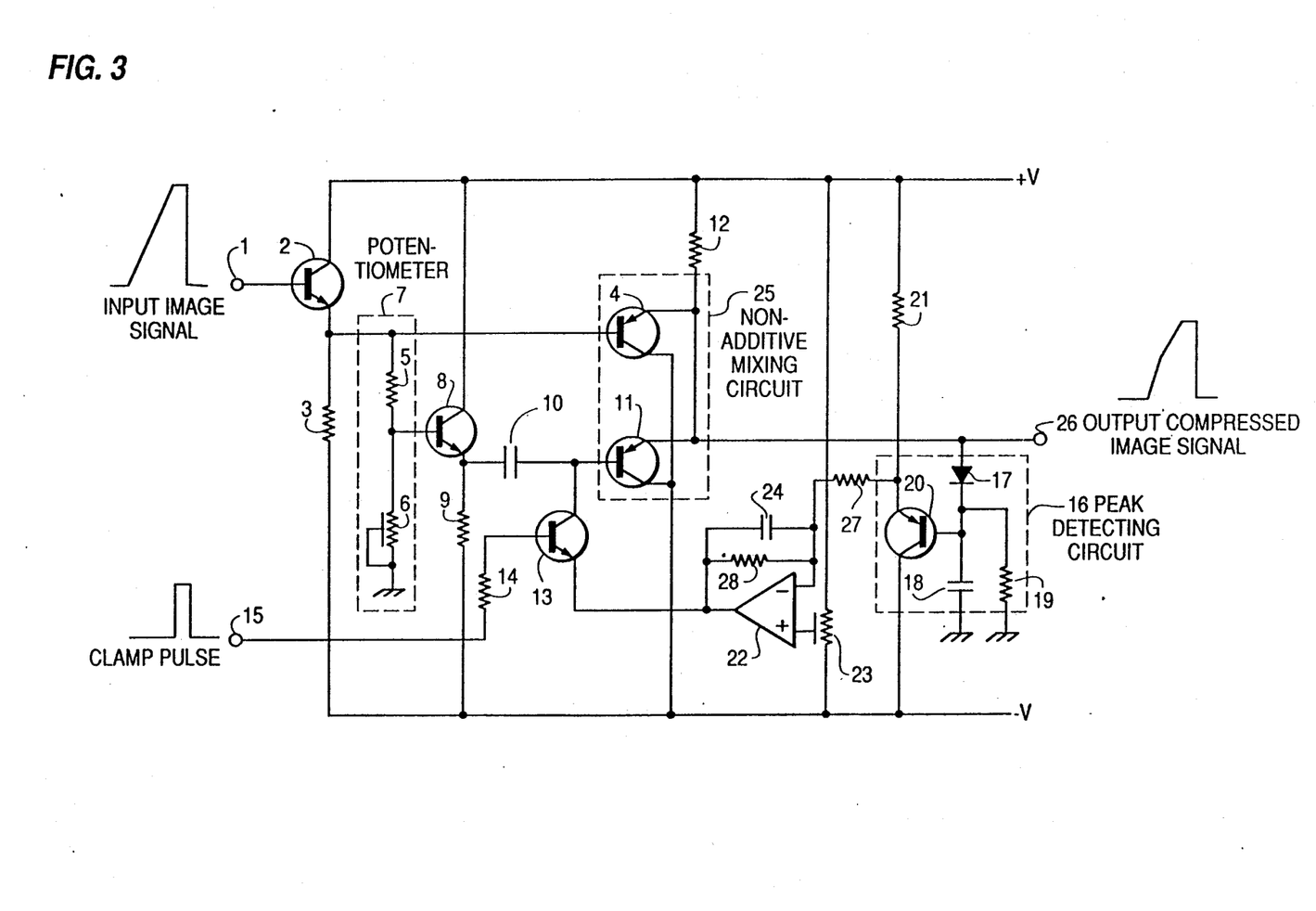
FIG. 3 is a circuit diagram depicting a detailed construction of the image signal compressing circuit shown in FIG. 2.

FIG. 3 is a circuit diagram illustrating an embodiment of the image signal compressing circuit according to the invention. The input image signal supplied to an input terminal 1 is applied to a base of a first transistor 2. An emitter of the transistor 2 is constructed as an emitter follower by connecting a resistor 3 to its emitter. An output voltage of the emitter follower is applied to a base of a second transistor 4. To the base of the second transistor 4 is connected a potentiometer 7 consisting of a fixed resistor 5 and a variable resistor 6. The image signal divided by the potentiometer 7 is applied to a base of a third transistor 8 which is also connected as an emitter follower. That is to say, the emitter of the third transistor 8 is connected to a negative voltage supply source $-V$ via a resistor 9. The potentiometer 7 and the third transistor 8 form an attenuating circuit. The emitter of the third transistor 8 is further connected via a capacitance 10 to a base of a fourth transistor 11. An emitter of the fourth transistor 11 is commonly connected to the emitter of the second transistor 4 and is connected to a positive voltage supply source $+V$ by means of resistor 12. Collectors of the second and fourth transistors 4 and 11 are commonly connected to the negative voltage supply source $-V$. In this manner, the second and fourth transistors 4 and 11 constitute a non-additive mixing circuit 25 which is usually called a black NAM.

The base of the fourth transistor 11 is connected to a collector of a fifth transistor 13 whose base is connected via a resistor 14 to a control terminal 15 to which a clamp pulse is applied. The clamp pulse is generated in synchronism with the blanking period of the television signal. The commonly connected emitters of the second and fourth transistors 4 and 11 constituting the non-additive mixing circuit 25 are further connected to a peak detecting circuit 16. The peak detecting circuit 16 comprises diode 17, capacitance 18, resistor 19 and sixth transistor 20 which forms a buffer amplifier. In the present embodiment, a time constant of the peak detecting circuit 16 is set to about 20 H, where H denotes a horizontal scanning period of the television signal. The sixth transistor 20 is constituted by connecting a resistor 21 to its emitter. A peak value appearing at the emitter of the sixth transistor 20 is applied to an inverted input terminal of a differential amplifier 22 to whose non-inverted input terminal is applied a reference voltage suitably set by a variable resistor 23. An output of the differential amplifier 22 is applied to the emitter of the fifth transistor 13. The gain of the differential amplifier 22 is determined by a resistor 28 connected across the output terminal and the inverted input terminal.

The above mentioned image signal compressing circuit according to the invention operates in the following manner.

Figure 4:
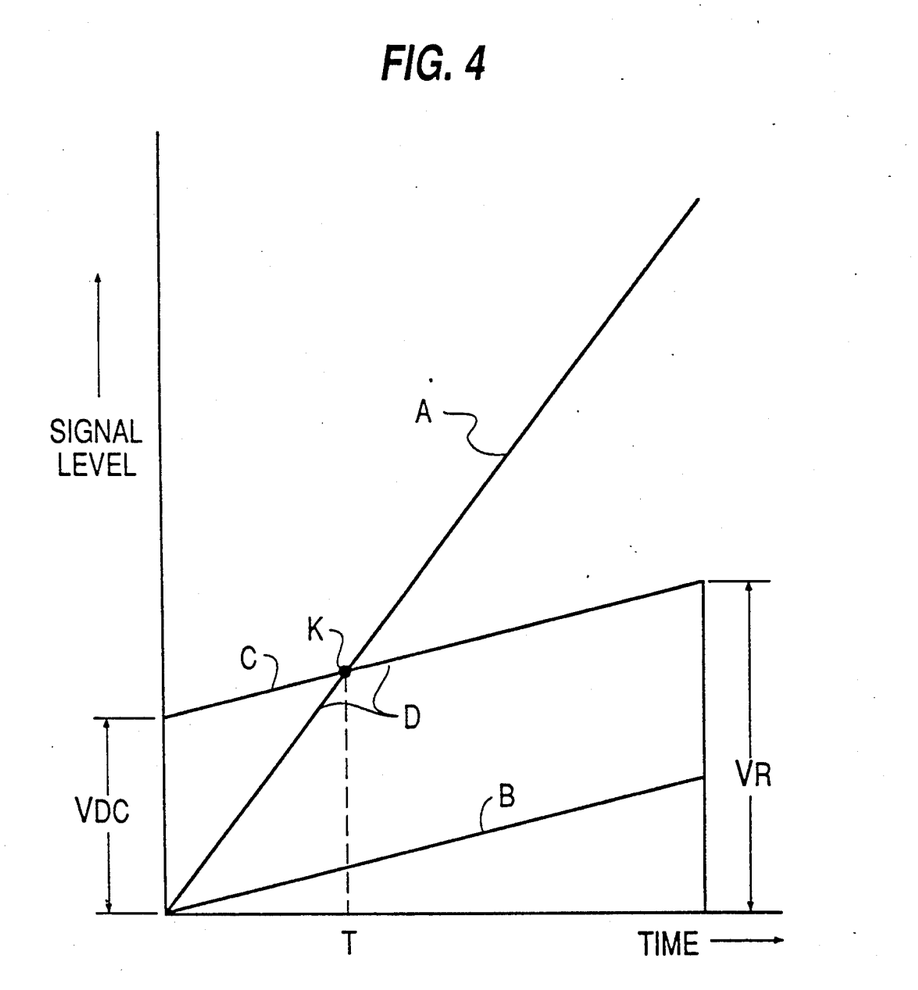
FIGS. 4, 5, 6 and 7 are graphs representing the operation of the circuit shown in FIG. 3.

It is assumed that the input image signal supplied to the input terminal 1 is linearly increased in accordance with the progress of time as illustrated by a straight line A in FIG. 4. Such an image signal is generated when an image whose brightness is gradually changed from black to white viewed in the scanning direction is picked-up. The input image signal A appears at the emitter of the first transistor 2 serving as the emitter follower. At the same time, the image signal is divided by the potentiometer 7 and a divided image signal, i.e. an attenuated image signal is produced. In FIG. 4, the attenuated image signal is represented by a straight line B. An attenuation factor can be adjusted by means of the variable resistor 6 in the potentiometer 7. That is to say, an inclination of the straight line B can be determined at will. The thus attenuated image signal appears at the emitter of the third transistor 8. A direct current components of the attenuated image signal is suppressed by the capacitance 10 and only an alternating current component thereof is passed to the base of the fourth transistor 11 of the non-additive mixing circuit 25. To the base of this fourth transistor 11 is also applied the variable direct current potential which is derived by means of the peak detecting circuit 16 and differential amplifier 22. The variable direct current potential is changed in dependence upon the peak value of the image signal. That is to say, the peak value of the output compressed image signal is detected by the peak detecting circuit 16 and the thus detected peak value is compared in the differential amplifier 22 with the reference potential determined by the variable resistor 23 to produce a differential therebetween. The thus produced difference is used as the variable direct current potential and is added to the attenuated image signal to produce the composite image signal. Therefore, when the peak value of the input image signal is low, the variable direct current potential becomes high and when the peak value of the image signal is low, the direct current potential becomes high. The thus derived direct current potential is added to the attenuated image signal whose direct current component has been removed by the capacitance 10. In FIG. 4, the attenuated image signal having the direct current potential VDC added thereto is represented by a straight line C.

Then the non-additive mixing circuit 25 selects smaller one of the input image signal A and the composite image signal and the thus selected image signal is supplied to the output terminal 26 as the output compressed image signal. Therefore, as long as the input image signal A is lower than the composite image signal C consisting of the attenuated image signal and the variable direct current potential, the input image signal A is selected, but after a time instant T at which the both image signals A and B become identical with each other, the composite image signal is selected. In this manner, the output image signal appearing at the output terminal 26 becomes non-linear as illustrated by a folded line D in FIG. 4. A maximum value of the output image signal is determined by the reference voltage V R set by the variable resistor 23. A knee point K at which the curve D is folded is changed in accordance with the peak value of the input image signal. This will be further explained in detail.

Figure 5:
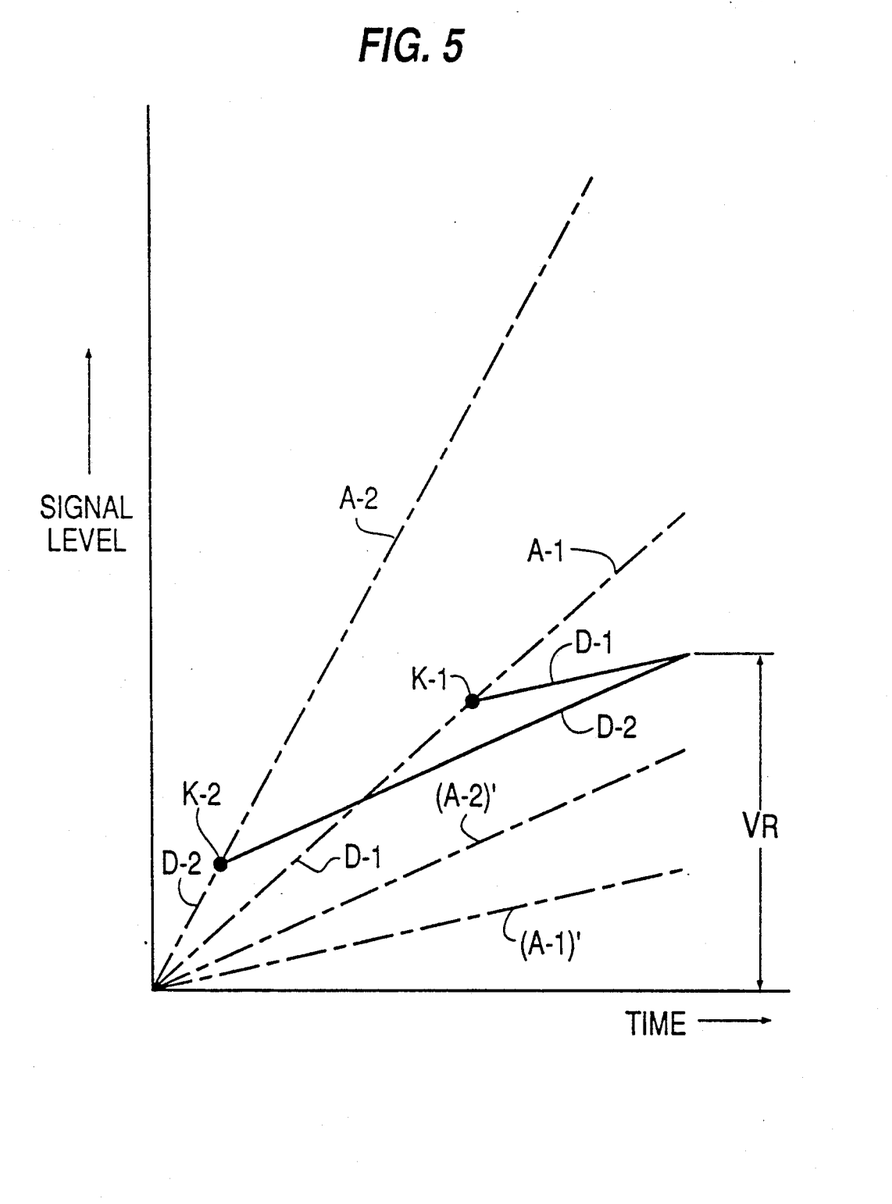

The attenuation factor of the attenuating circuit is fixed, so that when an input image signal A-1 having a lower amplitude is applied to the input terminal 1, an attenuated image signal (A-1)' is obtained and when an input image signal A-2 having a higher amplitude is applied, an attenuated image signal (A-2)' is derived by the attenuating circuit. Then, the attenuated image signals (A-1)' and (A-2)' result in output compressed image signals D-1 and D-2, respectively. Since the maximum value of the output compressed image signal is fixed to V R, knee points K-1 and K-2 are different from each other. That is to say, the knee point K-1 is higher than the knee point K-2.

Figure 6:
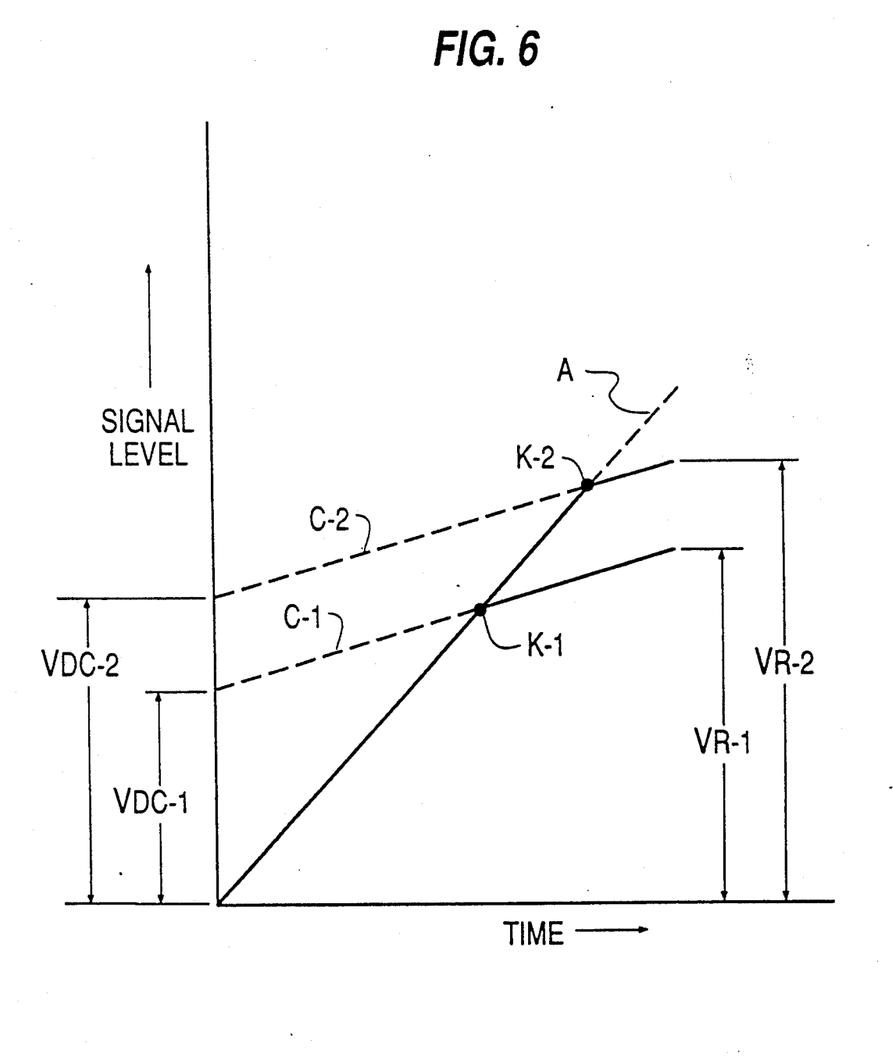

FIG. 6 shows the operation when the reference voltage V R is changed by adjusting the variable resistor 23. Under a condition that the input image signal A having a constant level is supplied to the input terminal 1, when the reference voltage VR is increased, the variable direct current potential is increased from VDC-1 to VDC-2. Therefore, the composite image signal applied to the base of the transistor 11 of the non-additive mixing circuit 25 is also changed from C-1 to C-2. Thus, the knee point is shifted from K-1 to K-2. It should be noted that the maximum value of the output compressed image signal is also changed from V R-1 to V R-2.

Figure 7:
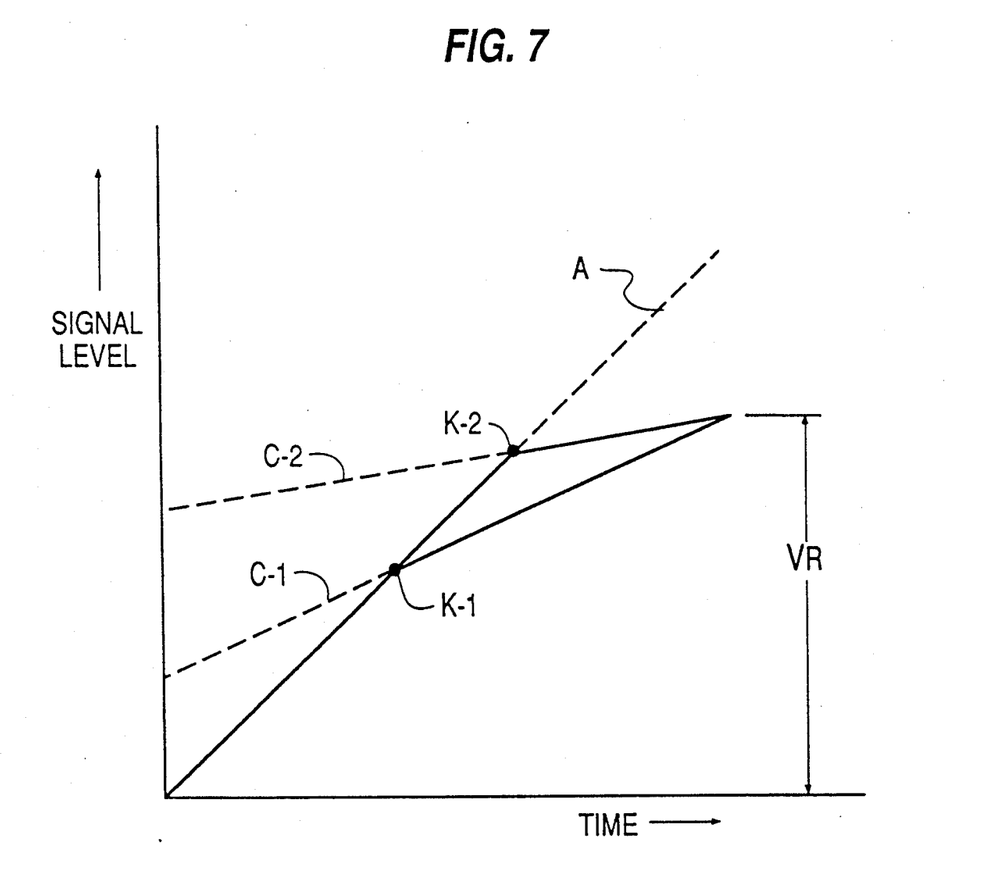

FIG. 7 shows the operation in which the variable resistor 6 in the potentiometer 7 is adjusted. Also in this case, the peak level of the input image signal is assumed to be constant. By adjusting the variable resistor 6, the inclination of the attenuated image signal is shifted from a straight line C-1 to a straight line C-2. Therefore, the knee point is also shifted from K-1 to K-2, while the maximum value of the output image signal is not changed.

As explained above, in the image signal compressing circuit according to the present invention, by suitably setting the maximum value of the output compressed image signal or the attenuation factor in the image signal attenuating circuit, it is possible to set the knee point at will, so that the image signal compressing circuit can be adjusted always optimally under various conditions.

When the image signal compressing circuit according to the invention is installed in a color television camera, the compressing circuits are provided in each respective color channels. However, if these image signal compressing circuits are operated independently form each other, operating points might differ from each other due to the fact that levels of respective color signals different from each other in dependence on an object to be picked-up. In order to remove such a drawback, a maximum signal level among the color signals is detected and the thus detected peak value is compared with the reference value and a difference between the detected peak value and the reference value is derived as the variable direct current potential.

Figure 8:
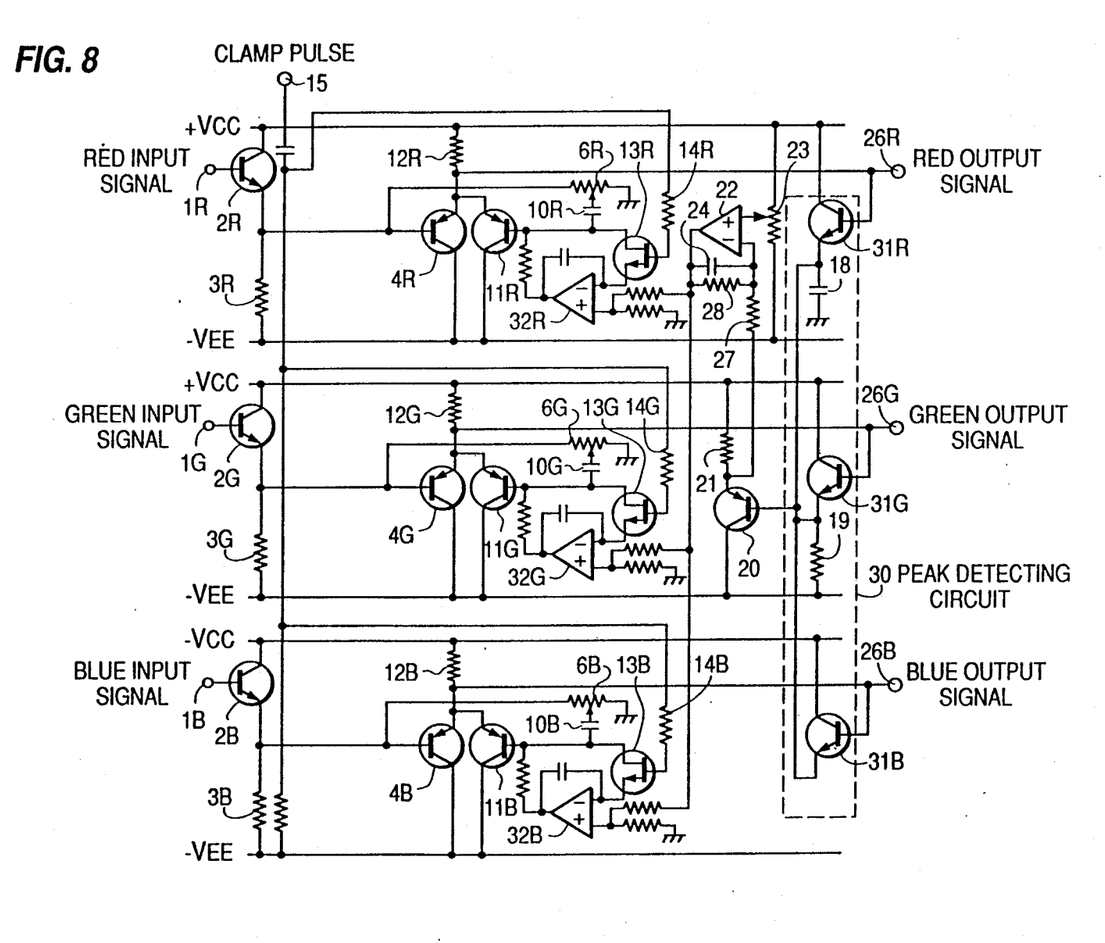
FIG. 8 is a circuit diagram of an image processing circuit of a color television camera to which the present invention is applied.

FIG. 8 is a circuit diagram of a signal processing portion of the color television camera including the image compressing circuit according to the invention. In FIG. 8 portions similar to those shown in FIG. 3 are denoted by the same reference numerals with R, G and B which represent red, green and blue colors, respectively. In order it select a color signal having a maximum value, there is provided a peak detecting circuit 30 including transistors 31R, 31G and 31B and the peak value is detected by a peak detecting circuit comprising capacitance 18, resistor 19 and transistor 20. The thus detected peak value is compared with the reference voltage in the differential amplifier 22 and a difference therebetween is applied to respective color channels as the variable direct current potential. In each color channels, the variable direct current potential is added to attenuated color image signals having the direct current components removed therefrom to generate the composite color image signals. The remaining construction of the image signal processing circuit shown in FIG. 8 is same as that illustrated in FIG. 3, so that its detailed explanation is dispensed with.

In the present embodiment, the maximum value among the three color image signals is selected, the variable direct current potential is formed in accordance wit the peak value of the thus selected color signal, and then the variable direct current potential is added to the respective color image signals. Therefore, the signal compression characteristic is same for all the color signals and thus the image signal having a high image quality can be obtained.

The present invention is not limited to the embodiments explained above, but many alternations and modifications may be conceived by those skilled in the art within the scope of the invention. For instance, in the above embodiments the attenuated image signal is derived by using the potentiometer consisting of the resistors, but according to the invention, the attenuating circuit may be constructed in various ways.

Figure 9:
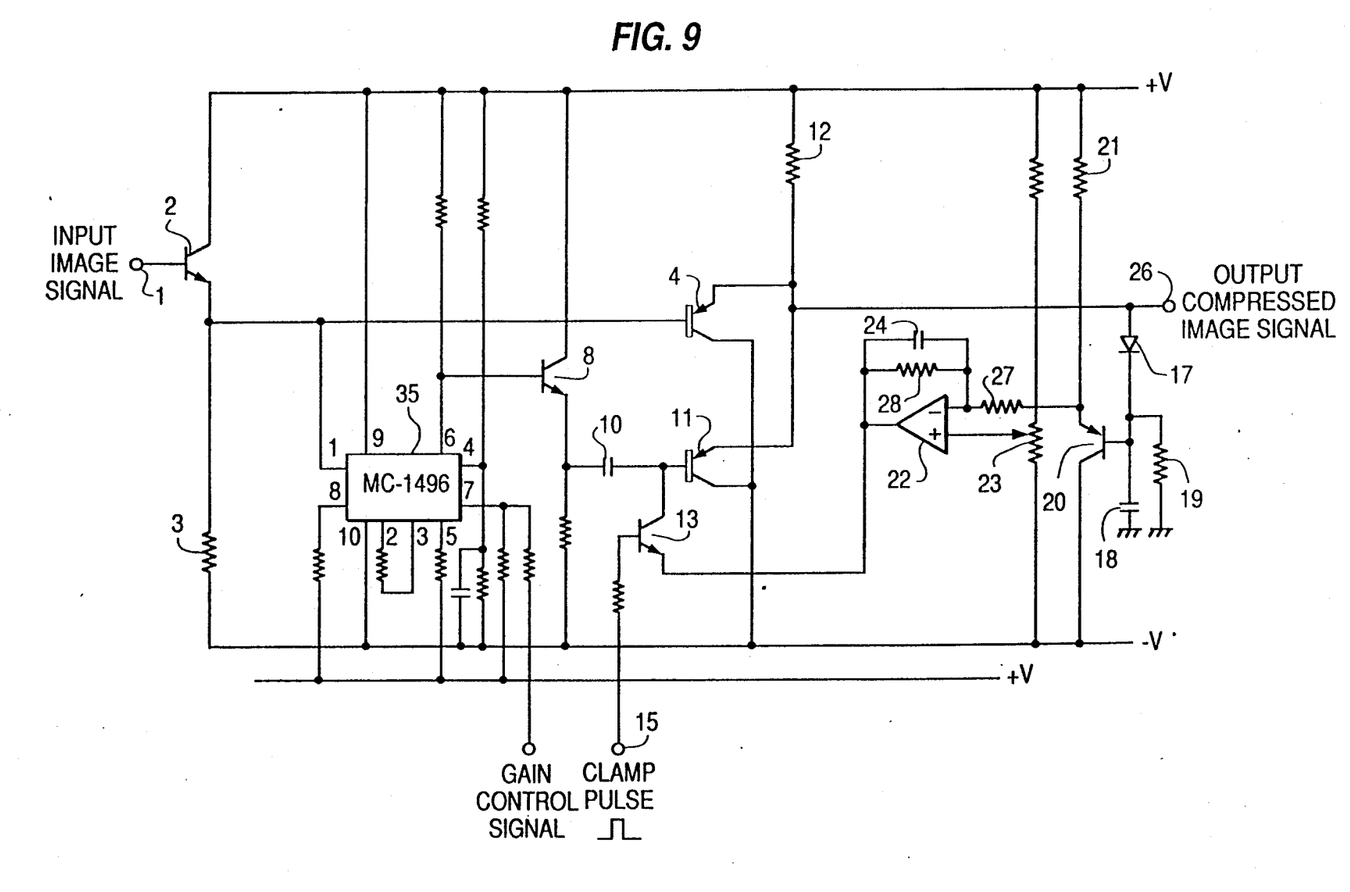
FIG. 9 is a circuit diagram showing another embodiment of the image signal compressing circuit according to the invention.

FIG. 9 is a circuit diagram illustrating another embodiment of the image signal compressing circuit according to the invention in which the attenuated image signal is produced by a multiplier. Also in the present embodiment, portions similar to those shown in FIG. 3 are denoted by the same reference numerals used in FIG. 3. The input image signal appearing at the emitter of the first transistor 2 and having a fixed direct current level is applied to a multiplier 35 which may be constructed by the balanced modulator-demodulator MC1496 manufactured by Motorola Company. A gain of the multiplier 35 can be adjusted at will by means of a gain controlling direct current voltage applied to a control terminal, i.e. a seventh pin.

Figure 10:
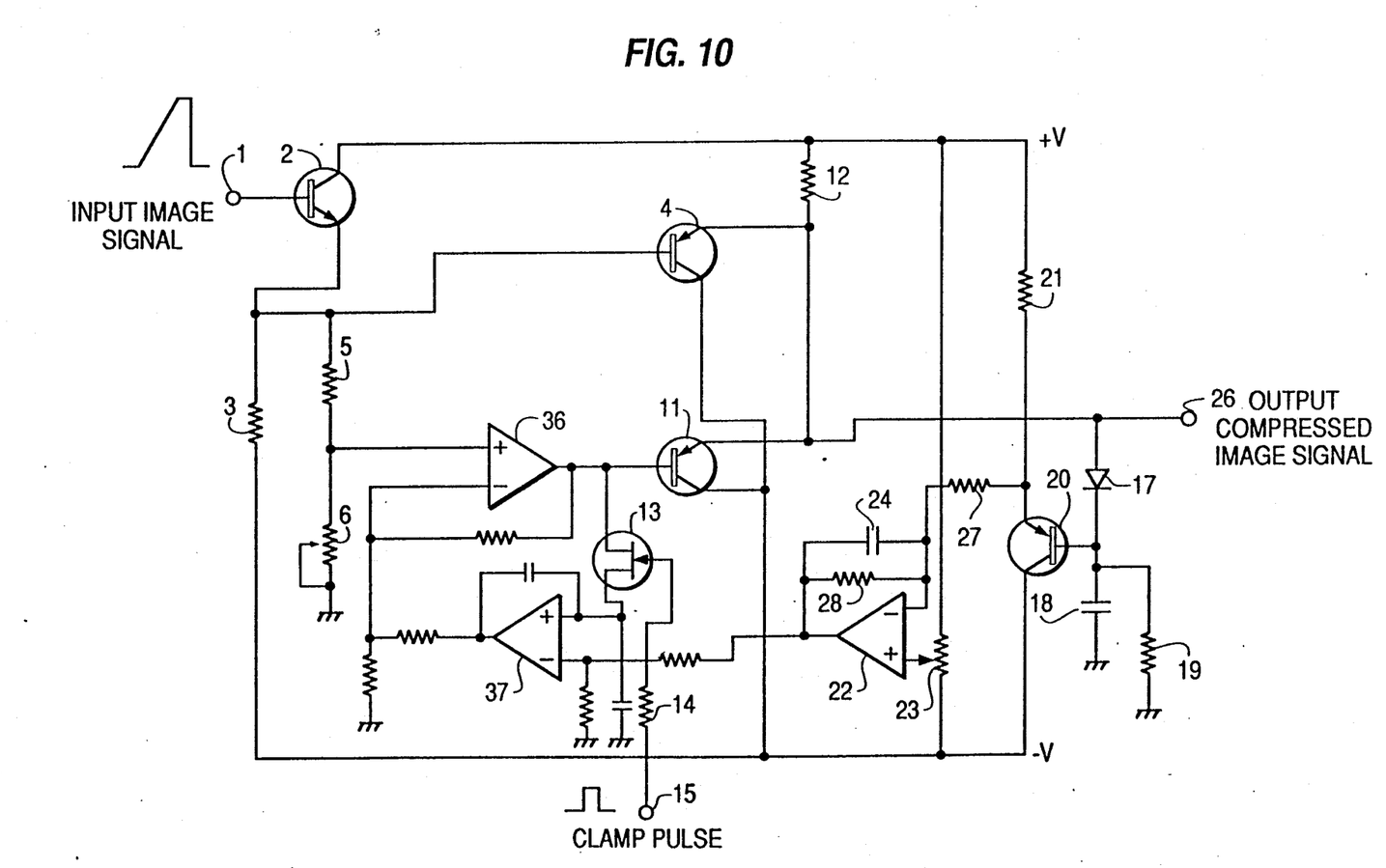
FIG. 10 is a circuit diagram depicting still another embodiment of the image signal compressing circuit according to the invention.

Moreover, in the above embodiment, only the alternating current component of the attenuated image signal is supplied to the direct current potential setting circuit. But according to the invention, the attenuated image signal having both the alternating current component and the direct current component may be applied to the direct current potential setting circuit as depicted in FIG. 10. That is to say, the attenuated image signal attenuated by the resistor divider is applied to a non-inverted input terminal of a differential amplifier 36, and the variable direct current potential formed by holding the peak value of the output compressed image signal is applied to a differential amplifier 37 constituting a feedback clamp circuit. Then, an output of the differential amplifier 37 is applied to an inverted input terminal of the differential amplifier 36. The remaining construction is the same as the embodiment shown in FIG. 3.

Figure 11:
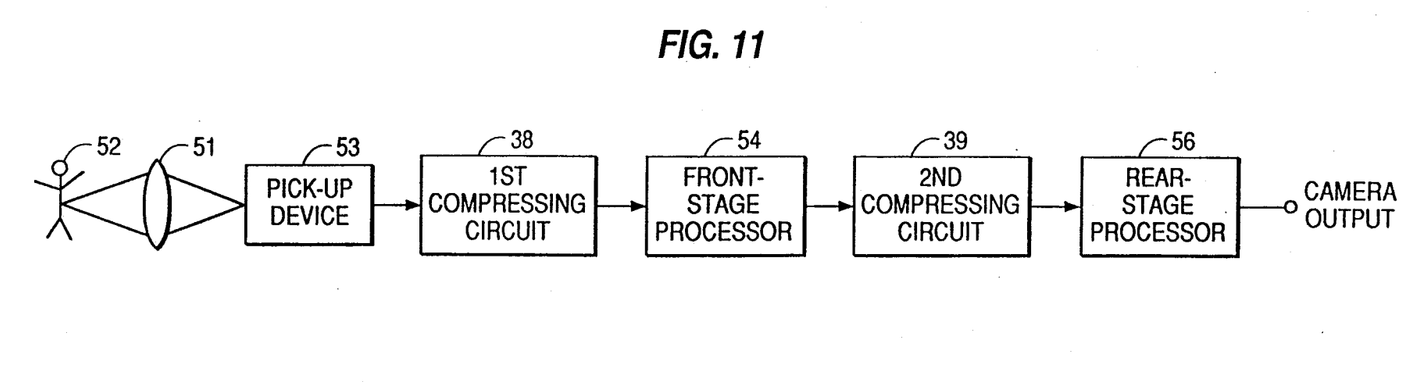
FIG. 11 is a block diagram illustrating the television camera comprising the image signal compressing circuit according to the invention.

When the image signal compressing circuit according to the invention is applied to the television camera, a first compression circuit 38 may be arranged between a pick-up device 53 for sensing an image of an object 52 formed by an imaging lens 51 and a front-stage image processing circuit 53, and a second compressing circuit 39 may be provided between the front-stage processing circuit 54 and a rear-stage processing circuit 56. Then, it is no more necessary for the front-stage processing circuit 53 to have the wide dynamic range, so that the supply source voltage may be reduced.

Figure 12:
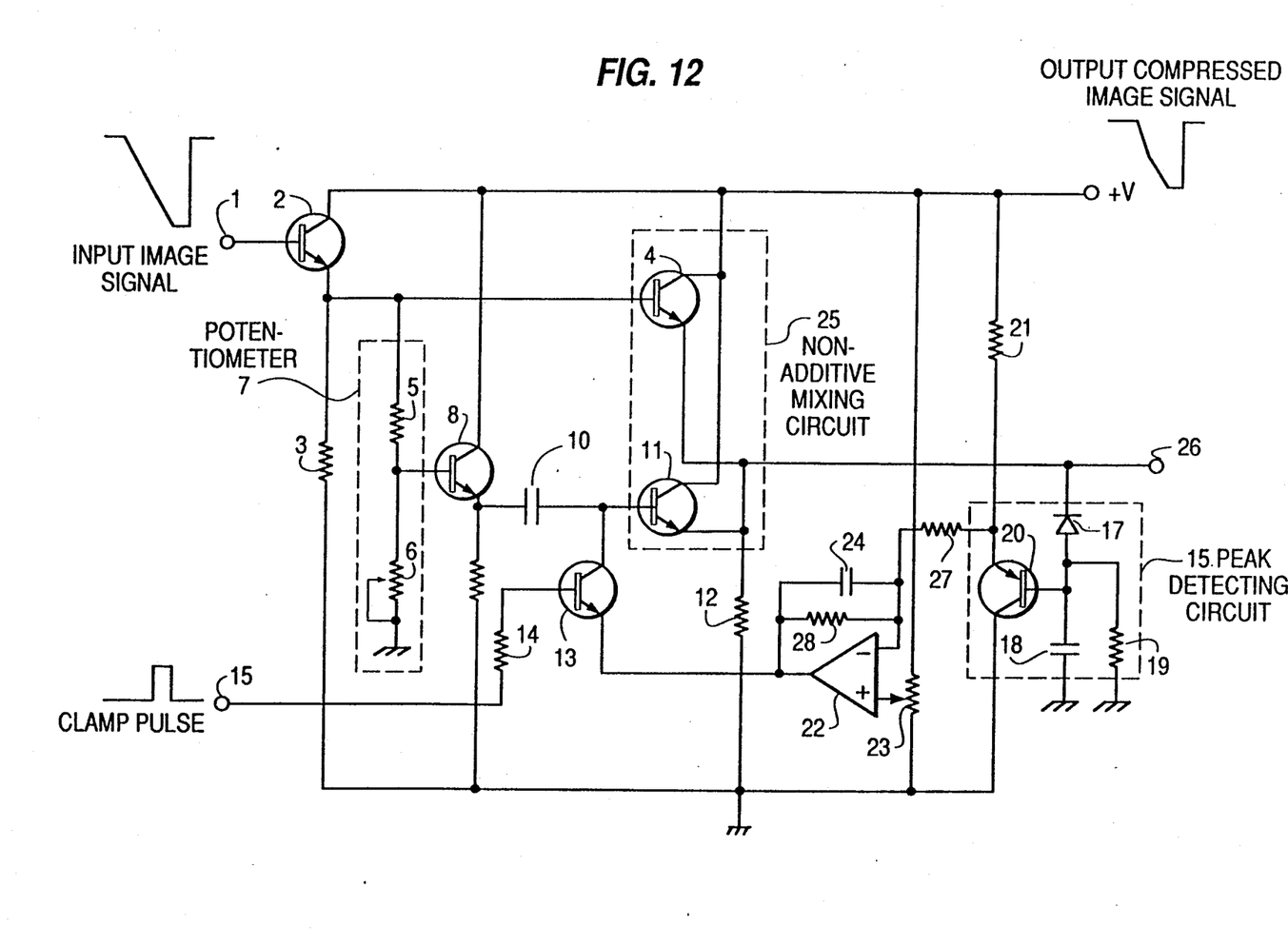
FIG. 12 is a circuit diagram showing still another embodiment of the image signal compressing circuit according to the invention.

In the embodiment illustrated in FIG. 3, the input image signal has a positive polarity, but it may have a negative polarity. Then, the transistors 4 and 11 of the non-additive mixing circuit 25 are changed from PNP type into NPN type, so that a higher image signal, i.e. an image signal whose absolute value is smaller than the other is selected as shown in FIG. 12. Also the polarity of the diode 17 is reversed. The remaining construction is entirely same as that of FIG. 3. As explained above, in the image signal compressing circuit according to the invention, the knee point is changed in dependence upon the maximum value of the image signal, so that the dynamic range of the image signal can be compressed optimally without decreasing the contrast and the peak value of the output compressed image signal can be kept at a desired level which can be set at will.

What is claimed is:

1. A circuit for compressing an image signal comprising:
   attenuating means for attenuating an input image signal by an attenuation factor to derive an attenuated image signal;
   direct current level setting means for adding a variable direct current potential to the attenuated image signal to derive a composite image signal;
   non-additive mixing means for receiving the input image signal and the composite image signal consisting of the attenuated image signal and the variable direct current potential and selecting a smaller image signal as a compressed image signal;
   maximum value detecting means for detecting a maximum value of the compressed image signal; and
   variable direct current potential forming means for receiving the maximum value of the compressed image signal to generate the variable direct current potential which is supplied to said direct current level setting means such that the maximum value of the compressed image signal derived from said non-additive mixing means does not exceed a predetermined level.

2. A circuit according to claim 1, wherein said attenuating means comprises a potentiometer having an output terminal for generating a divided input image signal, across said potentiometer being applied said input image signal, and an amplifier having an input terminal connected to the output terminal of the potentiometer and an output terminal for generating the attenuated image signal.

3. A circuit according to claim 2, wherein said potentiometer comprising a fixed resistor and a variable resistor for setting said attenuation factor connected in series with each other and said output terminal is connected to a junction point between said fixed resistor and the variable resistor, and said amplifier is constituted by an emitter follower transistor whose base is connected to said output terminal of the potentiometer.

4. A circuit according to claim 1, wherein said attenuating means comprises a multiplier having an input terminal for receiving the input image signal and a gain control terminal for receiving a gain control signal.

5. A circuit according to claim 1, wherein said direct current level setting means comprises means for removing a direct current component of the attenuated image signal to derive an alternating component of the attenuated image signal and adding means for adding the variable direct current potential to said alternating component of the attenuated image signal.

6. A circuit according to claim 5, wherein said means for removing the direct current component of the attenuated image signal is formed by a capacitance.

7. A circuit according to claim 5, wherein said adding means for adding the variable direct current potential to the alternating component of the attenuated image signal comprises a switching transistor which is controlled by a clamp pulse which is generated in synchronism with a blanking period of a television signal.

8. A circuit according to claim 1, wherein said non-additive mixing means comprises a first transistor having a base for receiving the input image signal, an emitter and a collector, a second transistor having a base for receiving the composite image signal, an emitter and a collector, an emitter resistor having one end commonly connected to said emitters of the first and second transistors and the other end connected to a first voltage supply source, and means for commonly connecting said collectors of the first and second transistors to a second voltage supply source, and an output terminal connected to a junction point of said emitters of the first and second transistors.

9. A circuit according to claim 1, wherein said variable direct current potential forming means comprises a differential amplifier having a first input terminal connected to an output of a peak detecting means and a second input terminal for receiving a reference voltage and an output terminal for generating the variable direct current potential which is changed in accordance with a difference between the peak value of the compressed image signal and the reference voltage.

10. A circuit according to claim 9, wherein said variable direct current potential forming means further comprises a variable resistor connected to said second input terminal of the differential amplifier so that the reference voltage is made variable.

11. A circuit according to claim 1, which is applied to a color television camera including red, green and blue channels, wherein said attenuating means comprises a first attenuating circuit arranged in the red channel for attenuating a red color signal, a second attenuating circuit provided in the green channel for attenuating a green color signal and a third attenuating circuit provided in the blue channel for attenuating a blue color signal;

said direct current level setting means comprises a first adding circuit provided in the red channel for adding the variable direct current potential to an attenuated red color signal to produce a composite red color signal, a second adding circuit provided in the green channel for adding the variable direct current potential to an attenuated green color signal to produce a composite green color signal and a third adding circuit provided in the blue channel for adding the variable direct current potential to an attenuated blue color signal to produce a composite blue color signal;

said non-additive mixing means comprises a first non-additive mixing circuit provided in the red channel for selecting a smaller signal between the input red color signal and the composite red color signal as a compressed red color signal, a second non-additive mixing circuit provided in the green channel for selecting a smaller signal between the input green color signal and the composite green color signal as a compressed green color signal, and a third non-additive mixing circuit provided in the blue channel for selecting a smaller signal between the input blue color signal and the composite blue color signal as a compressed blue color signal wherein;

a peak value detecting means is provided to detect a maximum value between the compressed red, green and blue color signals; and wherein said direct current forming means forms a variable direct current potential in accordance with said maximum value between the compressed red, green and blue signals; whereby said variable direct current potential is parallelly applied to the first, second and third adding circuits of said direct current level setting means.

* * * * *